INVENTORS.
VICTOR A. MILLER
BY ROBERT B. HORSFALL, JR.

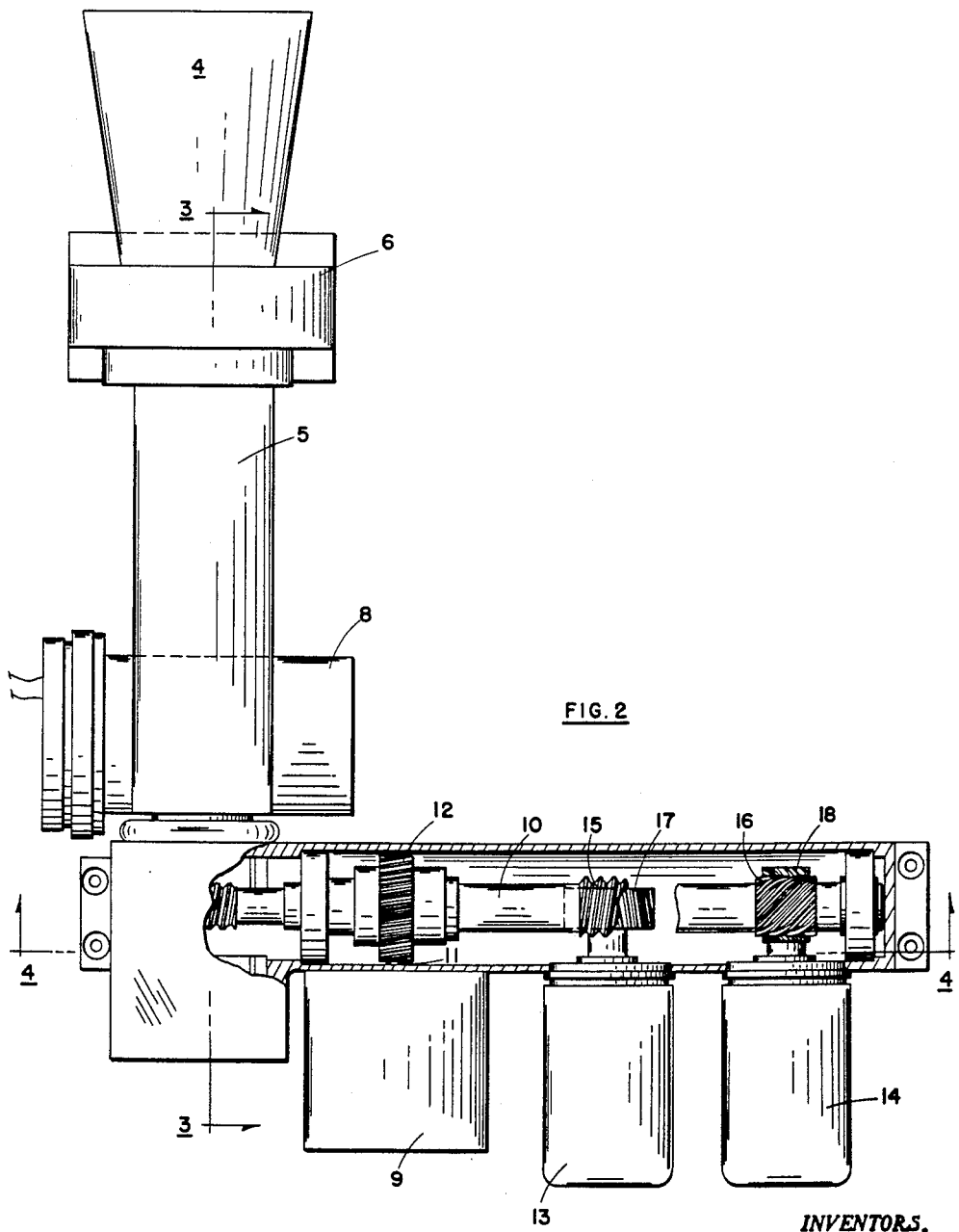

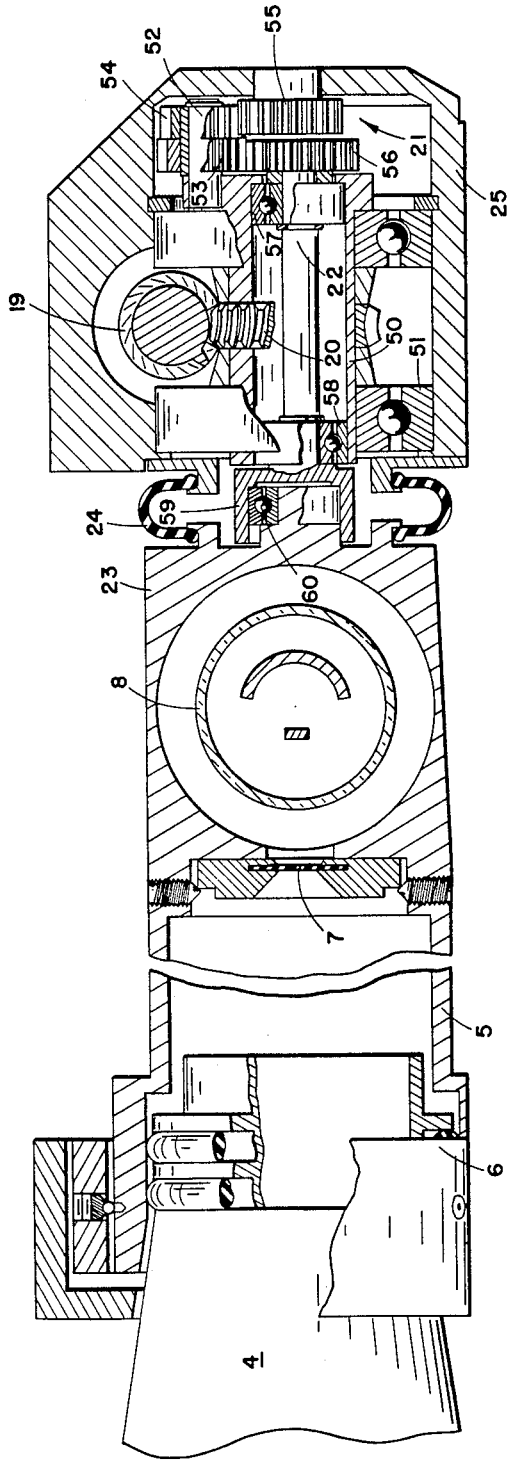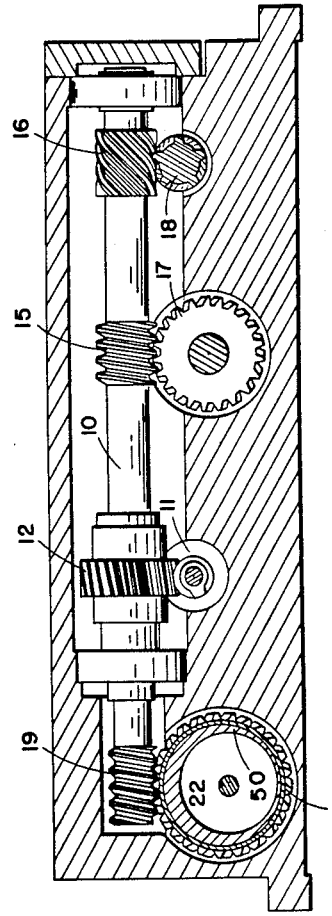

ATTORNEY ered embodiment of this invention;

United States Patent Office
3,018,378
Patented Jan. 23, 1962

3,018,378
RADIANT ENERGY SCANNING SYSTEM
Victor A. Miller, Long Beach, and Robert B. Horsfall, Jr., Whittier, Calif., assignors to North American Aviation, Inc.
Filed Sept. 20, 1954, Ser. No. 457,087
14 Claims. (Cl. 250—236)

This invention pertains to a means for scanning the optical field of a telescope to determine the direction of radiant energy relative to the axis of said telescope.

All mathematical terms are defined herein as defined in Mathematics Dictionary, by Robert C. James, The Digest Press, Van Nuys, California, 1943.

One of the problems in the science of astronomy and navigation is the problem of detecting the direction of a source of radiant energy relative to an axis whose direction is known. An analogous problem is the problem of detecting the direction of a region of less radiation in the presence of an illuminated field relative to an axis whose direction is known. It has heretofore been common practice to utilize a roatating reticle such as, for example, a rotating one-half sector disc which sweeps the optical field of a telescope in the focal plane thereof to detect the direction of a source of radiant energy.

There are three disadvantages of a rotating reticle which are overcome by the device contemplated by this invention. With a rotating reticle, a large amount of unused illumination impinges upon the sensitive surface of the photocell, which increases the background noise. Another disadvantage of some rotating reticle systems is that there is continual movement of the illumination on the sensitive surface of the photocell, which generates electrical signals due to the varying sensitivity of the sensitive surface. To further aggravate the deficiencies of a rotating reticle system, a special reticle is required to avoid first order gradients of illumination. Each of these special reticles requires that the illumination be increased.

The preferred embodiment of the device contemplated by this invention utilizes means forming a very small movable hole adjacent a photoelectric sensing device movable therewith, constrained to move over the optical field of the telescope within the depth of the focal plane or place at which the image occurs in a mode to cause the pinhole image of the exit pupil of the telescope to always strike the same portion of the cathode of the phototube. The motion of the means forming a hole relative to the field of view of the telescope within the depth of the focal plane of the telescope is such that the means forming a small hole periodically sweeps the entire field. The device contemplated by this invention utilizes a minimum amount of background radiation because of the small size of the means forming a hole, and permits decrease in first order gradient effects to a minimum by use of frequency selective filters in the photocell output. It also prevents movement of the illumination on the photocell because the photocell moves with the means forming a hole.

The sweep pattern generated by the device of this invention may be any configuration of a continuous path over the field of view of the telescope. However, for reasons of simplicity of mechanization, the preferred embodiment of this invention utilizes a sweep pattern which is a combination of two motions. The first motion is the rotation of a first point at a constant radius about a fixed point. The second motion is the rotation of a second point at a constant radius about the first point. The preferred motion of the second point, therefore, constitutes a closed "roulette," which includes, but is not limited to, the class of curves including epitrochoids, epicycloids, hypotrochoids and hypocycloids. It is to be noted that in the case of the epitrochoids and epicycloids, the rotation of the first point about a fixed point and the rotation of the second point about the first point is in the same direction, while in the case of the hypotrochoids and hypocycloids the directions of rotation are opposed.

Although the preferred movements of epitrochoids and hypotrochoids and, more particularly, prolate epitrochoids and prolate hypotrochoids are preferably generated by means of a mechanical device which moves the photosensitive device and means forming a small hole relative to the field of the telescope. The preferred movements may alternatively be obtained by optically moving the optical field of the telescope with the preferred motion relative to a stationary means forming a smal hole and photosensitive device by the use of rotatable optical wedges rotating within the light path.

It is therefore an object of this invention to provide means for optically scanning the field of view of a telescope with a relatively small aperture.

It is another object of this invention to provide means for scanning the field of view of a telescope while simultaneously presenting a minimum amount of illumination to a photosensitive device.

It is yet another object of this invention to provide a photoelectric scanning system for scanning the field of view of a telescope with no movement of illumination on the sensitive surface of the photoelectric device.

It is still another object of this invention to provide means for scanning the field of a telescope without detecting first order illumination gradients.

It is another object of this invention to provide means for scanning the field of view of a telescope with means forming a small hole and a photoelectric device.

It is another object of this invention to provide means for scanning the field of view of an optical system in a pattern which combines the rotation of a first point about a fixed point and the rotation of a second point about said second point.

It is still another object of this invention to provide means for scanning the field of view of an optical system substantially in an epitrochoidal pattern.

It is another object of this invention to provide means for scanning the field of view of an optical system substantially in a hypotrochoidal pattern.

It is still another object of this invention to provide means for scanning the field of view of an optical system substantially in the pattern of a prolate epitrochoid.

It is yet another object of this invention to provide means for scanning the field of view of an optical system substantially in the pattern of a prolate hypotrochoid.

Still another object of this invention is to provide rotating optical wedge means in the light path of a telescope for moving the field of said telescope in a predetermined pattern relative to means forming a small hole and to a photosensitive device.

Other objects and features of invention will become apparent from the following description taken in connection with the accompanying drawings, in which FIG. 1 is a diagram of a preferred prolate epitrochoidal scan pattern of this invention;

FIG. 2 is a plan view partially in section of the preferred embodiment of this invention;

FIG. 3 is a view partially in section taken at 3—3 in FIG. 2;

FIG. 4 is a view partially in section taken at 4—4 in FIG. 2;

Figure 1:
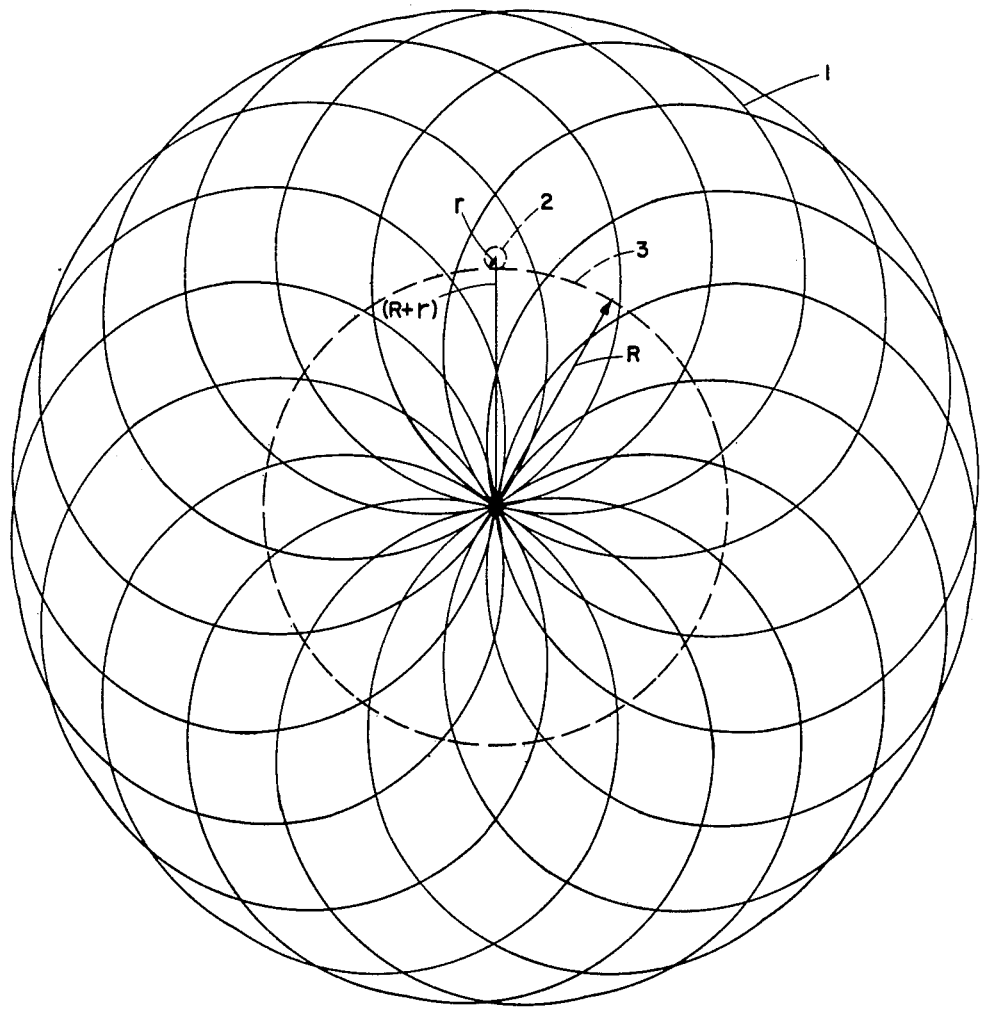

In the preferred embodiment of this invention, the sweep pattern which is generated is preferably either an epitrochoid or a hypotrochoid. A typical scan pattern is shown in FIG. 1, namely, a prolate epitrochoid. Heavy dark line 1 is a prolate epitrochoid generated by circle 2 rolling without slipping over the outside of the circumference of circle 3. The radius of circle 2 is $r$ and the radius of circle 3 is $R$. The length of the generator or the distance between the center of circle 2 and the instantaneous curve on line 1 is equal to $R+r$. When the entire circular field of an optical system is scanned in a prolate epitrochoidal scan pattern, or a prolate hypotrochoidal scan pattern, the length of the generator will be as shown in FIG. 1. If the length of the generator is less than $R+r$, only an annulus about the center of circle 3 is scanned. Note in FIG. 1 that $r$ is very much smaller than $R$. FIGS. 2, 3, and 4 show a mechanism adapted to scan the field of view of telescope 4 in an epitrochoidal or a hypotrochoidal scan pattern. Cylinder 5 prevents the introduction of extraneous light from an outside source and is gimbaled for freedom of rotation relative to the center of the exit pupil of telescope 4 by means of gimbal or universal joint 6. Means forming hole 7 and photoelectric means 8 are rigidly connected to move with cylinder 5. Means forming hole 7 is constrained to move on the surface of a sphere whose center is at the center of the exit pupil of telescope 4, and to move within the depth of the focal plane of telescope 4. Because photoelectric means 8 does not move relative to the incident light, all light which passes through means forming hole 7 strikes the same portion of photoelectric means 8.

Cylinder 5, means forming hole 7, and photoelectric means 8 can be moved in any kind of a predetermined continuous pattern, as, for example, a rectangular coordinate motion of the raster type, a spiral, or the preferred hypotrochoidal or epitrochoidal motion of scan of this invention.

A means for driving cylinder 5, means forming hole 7, and photoelectric means 8 in an epitrochoidal or a hypotrochoidal pattern is shown more particularly at the bottom of FIG. 2, the right of FIG. 3, and in FIG. 4. Motor 9 drives shaft 10 by means of worm 11 which engages gear 12. Shaft 10 drives resolvers 13 and 14 by means of worms 15, 16, and 18, and gear 17. The gear ratio between worm 15 and gear 17 and between worm 16 and worm 18 are such that the amplitudes of the electrical voltages generated by resolvers 13 and 14 are respectively proportional to $(R+r)\sin\omega_1 t$, $(R+r)\cos\omega_1 t$, $(R+r)\sin\omega_2 t$, and $(R+r)\cos\omega_2 t$ in which $\omega_1$ is proportional to the angular velocity with which the center of circle 2 moves about the center of circle 3 and $\omega_2$ is proportional to the angular velocity at which circle 2 rotates about its own center.

Shaft 10 is adapted by means of worm 19 and worm gear 20 to drive epicycloidal gear train 21. Worm gear 20 is attached to cylinder 50. Cylinder 50 rotates relative to frame 25 upon bearings 51. Cylinder 50 carries with it shaft 52 upon which are mounted for rotation gears 53 and 54. Gears 53 and 54 are bearing mounted to rotate relative to shaft 52. Stationary gear 55 is rigidly attached to frame 25 and meshes with gear 54. Gears 53 and 54 are rigidly attached together to rotate at the same angular velocity relative to shaft 52. Gear 56 rotates with shaft 22 and meshes with gear 53. Shaft 22 is eccentrically mounted relative to the axis of rotation of frame 50 and is supported to be free to rotate by means of bearings 57 and 58. Frame 59 is rigidly attached to shaft 22 and is rotatingly attached to frame 23 by means of bearings 60. The axis of symmetry of frame 59 is eccentrically offset from the axis of rotation of shaft 22. It is readily seen that provided the ratio of the diameter of gear 55 to the diameter of gear 54 multiplied by the ratio of the diameter of gear 53 to the diameter of gear 56 is less than one, means forming hole 7 is driven in an epitrochoidal pattern, but if the ratio of the diameter of gear 55 to the diameter of gear 54 multiplied by the ratio of the diameter of gear 53 to the diameter of gear 56 is greater than one, means forming hole 7 moves in a hypotrochoidal pattern. Annulus 24 is merely a dust cover.

Figure 5:
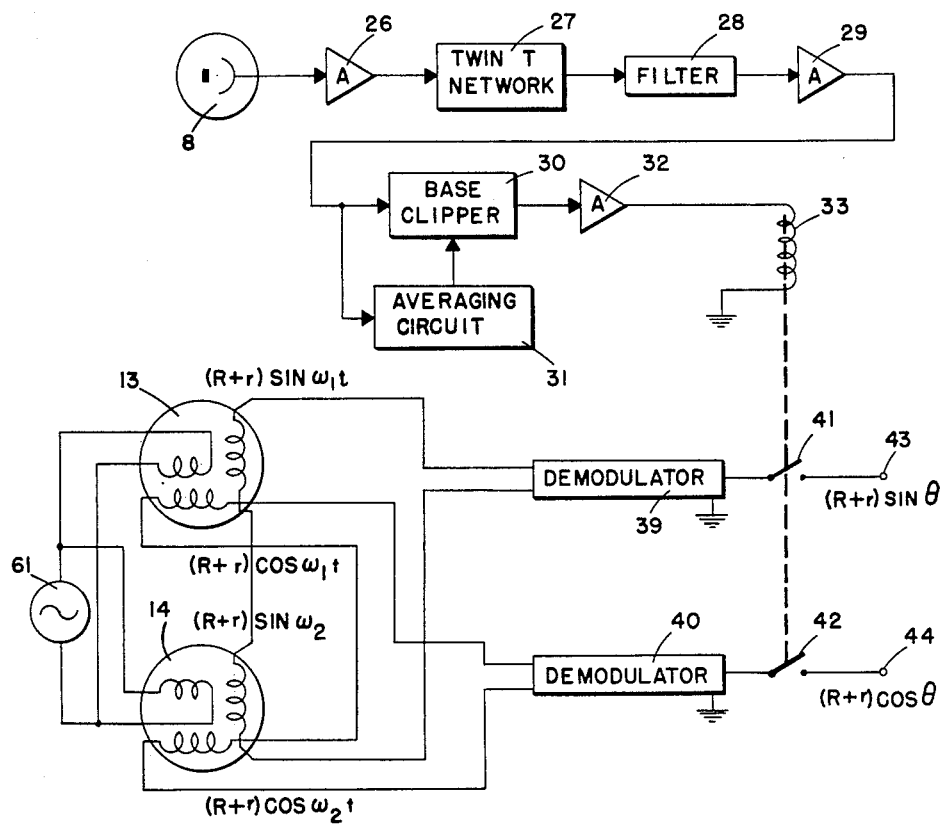
FIG. 5 is a block diagram of the electrical portion of this invention adapted to be utilized in combination with the preferred embodiment of this invention to obtain a pair of signals proportional to the rectangular coordinates of the position of the hole at the time a source of radiant energy is detected.

In FIG. 5 when, for example, the image of a star is crossed by means forming hole 7, photoelectric means 8 is momentarily energized. The electrical output of photoelectric means 8 is connected through amplifier 26 to the input of twin T network 27. Twin T network 27 is tuned to reject signals which have a frequency equal to the fundamental scan frequency to eliminate extraneous noise and first order gradient effects which have that particular frequency. Since the star signal is high in harmonic content, it passes through network 27. The output of network 27 is connected to the input of filter 28 which is preferably a resistance-capacitance filter. Filter 28 is a low-pass filter which rejects all frequencies above that necessary to resolve the signal in the presence of background noise. The output of filter 28 is connected through amplifier 29 to base clipper 30 and to averaging circuit 31. Averaging circuit 31 biases base clipper 30 so that base clipper 30 cuts off the majority of the noise present in the signal. The output of base clipper 30 is then connected through amplifier 32 to relay 33. Hence, relay 33 is only energized at the particular instant when means forming hole 7 intercepts the image of the star.

The rotating coil of resolver 13 and the rotating coil of resolver 14 is excited by means of alternating current voltage source 61. The stationary coils of resolvers 13 and 14 have induced in them a voltage, which has a magnitude proportional to the sine and cosine of their shaft rotations. Hence, as shown in FIG. 5, the electrical output voltages of resolver 13 are proportional to $(R+r)\sin\omega_1 t$ and $(R+r)\cos\omega_1 t$. The electrical output voltages of resolver 14 are proportional to $(R+r)\sin\omega_2 t$ and $(R+r)\cos\omega_2 t$. The sine output voltage of resolver 13 is connected in series with the sine output voltage of resolver 14. The cosine output voltage of resolver 13 is connected in series with the cosine output voltage of resolver 14. The sum of the sine voltages are connected through demodulator 39 to terminal 41. The sum of the cosin voltages are connected through demodulator 40 to terminal 42. Hence at the particular moment when means forming hole 7 crosses the image of a star, relay 33 is energized to close the contacts 41 and 42 and to place voltages upon terminals 43 and 44 which are proportional, respectively, to the rectangular coordinates of the position of the star image on the focal plane of telescope 4 relative to a predetermined set of rectangular axes.

Figure 6:
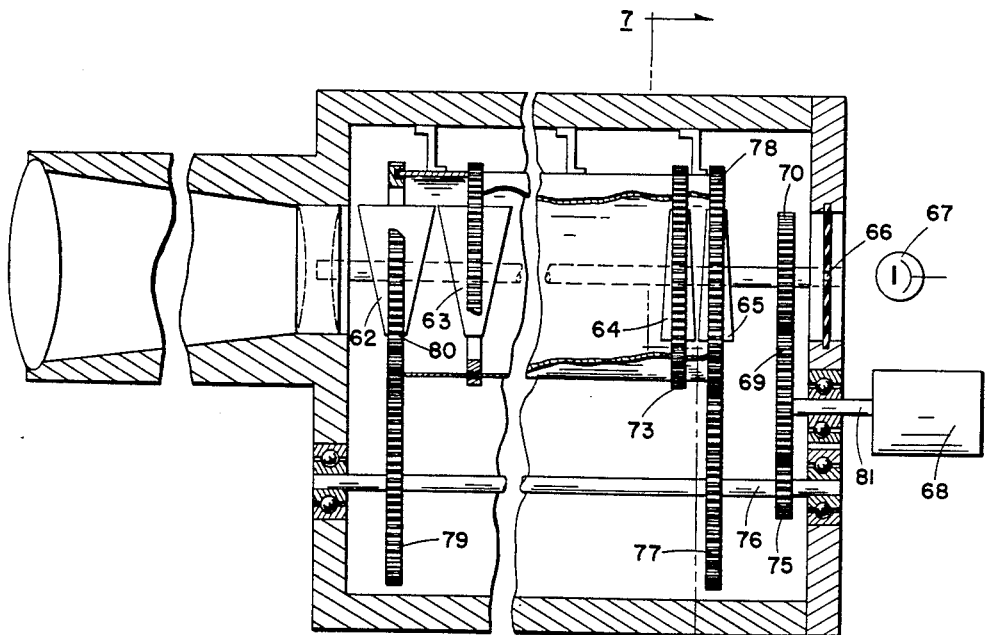
FIG. 6 is a side view of the device of this invention utilizing optical wedges.
Figure 7:
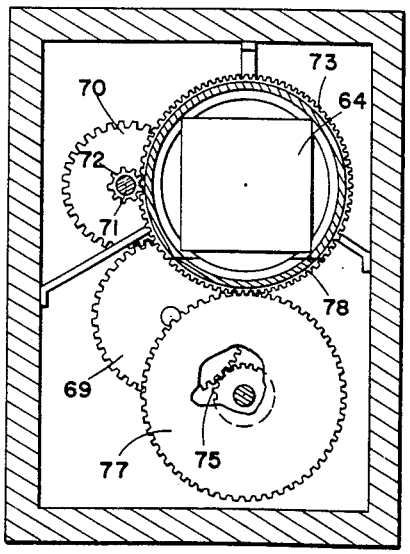
FIG. 7 is a view taken at 7—7 in FIG. 6.

The epitrochoidal and hypotrochoidal scan patterns may alternatively be generated by means of optical wedges as shown in FIGS. 6 and 7. Optical wedges 62, 63, 64 and 65 are placed in the light path of telescope 4. Wedges 62, 63, 64 and 65 are optical prisms which turn the direction of a light path through only a small angle. Wedges 62 and 65 are driven at one speed while wedges 63 and 64 are driven at another speed. Wedge 62 is driven slowly to deflect the incoming light off of the axis of telescope 4 by a distance equal to the distance between the center of circle 3 and the center of circle 2. Wedge 63 further deflects the incident light by a distance equal to the distance between the centers of circles 2 and 3. The light then strikes wedges 64 and 65 which correct the direction of the light to cause it to continue parallel to the axis of telescope 4. In the device of FIGS. 6 and 7 the entire optical field of telescope 4 is moved in an epitrochoidal or hypotrochoidal path to cause the image of a distant star to pass over means forming hole 66 at some time during the motion of the field. All light passing through means forming hole 66 impinges upon photoelectric means 67. Motor 68 drives gear 69 which in turn drives gear 70. Gear 70 drives shaft 71 which in turn drives gear 72 to drive gear 73 which in turn drives wedge 64. Similarly another gear upon shaft 71 drives a gear (not shown) which in turn drives gear 74. Gear 69 also drives gear 75 which in turn drives shaft 76 which drives gear 77 which in turn drives gear 78 that turns prism 65. Similarly gear 79 upon shaft 76 drives gear 80 which turns prism 62. Resolvers may be attached to shaft 81 as shown in connection with FIG. 4 to provide a reference voltage for providing information concerning the rectangular coordinates of the star image within the field of view of telescope 4.

Thus a means is provided for accurately determining the position of a source of light or star image relative to the axis of a telescope. It is to be readily seen that the substitution of an infrared detector or other radiation detector for photoelectric means 8 causes the device of this invention to be an infrared detector or a detector of other radiation. It is further readily seen that by, for example, placing an additional stage of phase inversion within amplifier 32, relay 33 may be caused to close only in the absence of radiation whereby a point source of non-radiation in the presence of a generating field of radiation is readily detected. An example of a point of non-radiation is a distant aircraft passing between the objective lens of telescope 4 and a background of bright sky.

The preferred embodiment of the device of this invention utilizes no optical lenses or prisms between the exit pupil of telescope 4 and photoelectric means 8. Hence, where light from a distant star is extremely weak, the device of this invention has performance which is superior to known star or radiation detectors.

Although the invention has been described and illustrated in detail, it is to be clearly understood that the same is by way of illustration and example only and is not to be taken by way of limitation, the spirit and scope of this invention being limited only by the terms of the appended claims.

We claim:
1. Means for scanning an image of an optical field comprising means forming a small hole positioned substantially in the image plane of said optical field, an optical detecting device positioned to receive light from the portion of the image passing through said means forming a small hole, and means for producing relative motion of said means forming a small hole and said image, said relative motion being in a closed roulette pattern whereby said optical detecting device scans said optical field.

2. A device as recited in claim 1 in which said roulette pattern is generated by a combination of two motions, the first motion being the rotation of a first point at a constant radius about a fixed point, the scanning motion being the rotation of a second point at a constant radius about said first point, whereby said second point moves in a roulette.

3. The device as recited in claim 1 in which said roulette pattern is an epitrochoid.

4. A device as recited in claim 1 in which said roulette pattern is a hypotrochoid.

5. Means for scanning an image of an optical field comprising means forming a movable hole positioned upon the focal plane of said optical field, a photoelectric sensing device positioned to receive light from the portion of the image passing through said means forming a movable hole, an epicyclic gear train drivingly attached to said photoelectric device and said means forming a hole to move them in an epitrochoidal pattern.

6. A device as recited in claim 5 and further comprising means between said optical field and said means forming a movable hole for eliminating extraneous light.

7. Means for scanning an image of an optical field comprising means forming a movable hole positioned upon the focal plane of said optical field, a photoelectric sensing device positioned to receive light from the portion of the image passing through said means forming a movable hole, an epicyclic gear train attached to drive said photoelectric device and said means forming a hole with respect to said optical field in a hypotrochoidal pattern.

8. A device as recited in claim 7 and further comprising means between said optical field and said means forming a movable hole for eliminating extraneous light.

9. In combination, a telescope, means forming a hole positioned upon the focal plane of said telescope, a photoelectric device positioned to collect light passing through said means forming a hole, an epicyclic gear train attached to drive said photoelectric device and said means forming a hole in an epitrochoidal pattern over the field of said telescope, and means for driving said gear train.

10. In combination, a telescope, means forming a hole positioned upon the focal plane of asid telescope, a photoelectric device positioned to collect light transmitted by said telescope through said means forming a hole, an epicyclic gear train attached to drive said photoelectric device and said means forming a hole with respect to said telescope in a prolate epitrochoidal pattern over the field of said telescope.

11. In combination, a telescope, means forming a hole positioned upon the focal plane of said telescope, a photoelectric device positioned to collect light transmitted by said telescope through said means forming a hole, an epicyclic gear train attached to drive said photoelectric device and said means forming a hole with respect to said telescope in a hypotrochoidal pattern over the field of said telescope.

12. In combination, a telescope, means forming a hole positioned upon the focal plane of said telescope, a photoelectric device positioned to collect light transmitted by said telescope through said means forming a hole, and an epicyclic gear train attached to drive said photoelectric device and said means forming a hole with respect to said telescope in a prolate hypotrochoidal pattern over the field of said telescope.

13. In combination, a telescope, means for scanning the field of said telescope by a combination of two motions, the first motion being a rotation of a first point at a constant radius about a fixed point, the scanning motion being the rotation of a second point at a constant radius about said first point whereby said second point moves in a closed roulette, said scanning means comprising two pairs of optical wedges in the optical path of said telescope, stationary means forming a hole positioned upon the focal plane of said telescope, a photoelectric sensing device positioned to receive light from the portion of the image passing through said means forming a hole, said wedges being positioned between the objective of said telescope and said means forming a hole, and mechanical drive means connected to said wedges to rotate each pair of wedges about their optical axes at different angular velocities.

14. In combination, a telescope, means for scanning the field of said telescope in a closed roulette pattern comprising two pairs of optical wedges in the optical path of said telescope, stationary means forming a hole positioned upon the focal plane of said telescope, a photoelectric sensing device positioned to collect light passing through said means forming a hole, said wedges being positioned between the objective of said telescope and said means forming a hole, mechanical drive means connected to said wedges to drive each pair of said wedges at a different angular velocity.

References Cited in the file of this patent
UNITED STATES PATENTS

| | | |
|---|---|---|
| 2,360,883 | Metcalf | Oct. 24, 1944 |
| 2,393,186 | Potter | Jan. 15, 1946 |
| 2,493,543 | Merchant | Jan. 3, 1950 |